United States Patent
Sperber et al.

(10) Patent No.: US 7,213,136 B2
(45) Date of Patent: May 1, 2007

(54) APPARATUS AND METHOD FOR REDUNDANT ZERO MICRO-OPERATION REMOVAL

(75) Inventors: Zeev Sperber, Zichron Yaakov (IL); Robert Valentine, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 10/631,628

(22) Filed: Jul. 30, 2003

(65) Prior Publication Data
US 2005/0027964 A1  Feb. 3, 2005

(51) Int. Cl.
*G06F 9/24* (2006.01)

(52) U.S. Cl. ................ 712/245; 712/226

(58) Field of Classification Search ............ 712/219, 712/245, 226
See application file for complete search history.

(56) References Cited

U.S. PATENT DOCUMENTS

| | | | |
|---|---|---|---|
| 5,898,867 A * | 4/1999 | Getzlaff et al. ............. 712/248 |
| 5,918,031 A * | 6/1999 | Morrison et al. ............ 712/208 |
| 6,047,369 A * | 4/2000 | Colwell et al. .............. 712/217 |
| 6,098,165 A * | 8/2000 | Panwar et al. ............... 712/215 |
| 6,330,657 B1 * | 12/2001 | Col et al. ...................... 712/23 |
| 6,453,278 B1 * | 9/2002 | Favor et al. ................... 703/27 |
| 6,581,154 B1 * | 6/2003 | Zaidi ........................... 712/210 |
| 6,820,190 B1 * | 11/2004 | Knebel et al. ............... 712/215 |

* cited by examiner

*Primary Examiner*—Eric Coleman
(74) *Attorney, Agent, or Firm*—Blakely, Sokoloff, Taylor & Zafman LLP

(57) ABSTRACT

A method and apparatus for redundant zero micro-operation removal. In one embodiment, the method includes the identification of a predetermined macro-instruction. Once identified, a value associated with a source register operand of the identified macro-instruction is determined. Once determined, the identified macro-instruction is decoded into a first macro operation and a second micro-operation if the determined value is not set. Otherwise, the identified macro-instruction is decoded into a single micro-operation if the determined value is set. Accordingly, the method described prevents the generation of redundant micro-operations that use valuable resources, such as allocation slots, as well as execution units within the processor core.

33 Claims, 10 Drawing Sheets

APPARATUS AND METHOD FOR REDUNDANT ZERO MICRO-OPERATION REMOVAL

FIELD OF THE INVENTION

One or more embodiments of the invention relate generally to the field of integrated circuit and computer system micro-architecture design. More particularly, one or more of the embodiments of the invention relates to a method and apparatus for redundant zero micro-operation removal.

BACKGROUND OF THE INVENTION

Internet audio and video streaming, as well as image processing and video content creation continuously drive system architects to design even faster microprocessors. In order to improve microprocessor performance, several techniques are used to improve the efficiency of modern day processors. One such technique for providing more efficient microprocessors is "Dynamic Execution". In summary, Dynamic Execution functions by determining the most efficient manner for executing program instructions, irrespective of the order in which the program instructions are received.

Dynamic Execution uses front-end logic that fetches the next instructions within a program and prepares the instructions for subsequent execution in the machine pipeline. This front-end logic utilizes highly accurate branch prediction logic that uses the past history of program execution to speculate where the program is going to execute next. The predicted instruction address from this front-end branch prediction logic is used to fetch instruction bytes from a level two (L2) cache. Once fetched, these instruction bytes are decoded into basic operations called micro-operations (uOPs) that the execution core can execute.

As such, these micro-operations are provided to out-of-order (OOO) execution logic, along with a sequence number assigned to each uOP. The OOO execution logic has several buffers that it uses to sort and reorder the flow of instructions to optimize performance as instructions go down the pipeline and get scheduled for execution. OOO execution allows program instructions to proceed around the delayed instructions as long as they do not depend on those delayed instructions. As a result, uOPs do not stall when following delayed instructions, in which case, efficiency dictates that the instructions execute in an out-of-order fashion.

The OOO execution logic generally includes retirement logic that reorders the instructions, executed in an out-of-order fashion (dynamic manner), back into the original program order. As a result, OOO execution logic generates a pool of active uOPs that can be executed in a manner which is more efficient than conventional systems. However, in order to implement out-of-order execution, register renaming logic is required to rename logical registers in order to use physical register files. In addition, the renaming logic is required for execution of legacy instructions with improved efficiency.

The described dynamic execution may be implemented within microprocessors that support 128-bit streaming single instruction multiple data (SIMD) extensions (SSE) and streaming SIMD extensions 2 (SSE2) instruction set architectures (ISA). Generally, the 128-bit SSE and SSE2 ISAs ("128-bit ISA") are implemented by splitting each 128-bit instruction into two uOPs that generate the lower and upper 64-bit chunks of the 128-bit register. These two halves of the architectural register are treated internally as two independent registers.

Unfortunately, for some macro-instructions from the 128-bit ISA, a 64-bit implementation of the 128-bit ISA, redundant uOP is generated during decoding of the macro-instructions. The redundant uOPs use valuable resources such as register allocation slots, as well as execution unit and uOP retirement execution bandwidth. Therefore, there remains a need to overcome one or more of the limitations in the above-described existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for redundant zero micro-operation-removal is described. In one embodiment, the method includes the identification of a predetermined macro-instruction. Once identified, a value associated with a source register operand of the identified macro-instruction is determined. Once determined, the identified macro-instruction is decoded into a first micro-operation and a second micro-operation if the determined value is not set. Otherwise, the identified macro-instruction is decoded into a single micro-operation if the determined value is set. Accordingly, the method described prevents the generation of redundant micro-operations that use valuable resources, such as allocation slots, as well as execution units within the processor core.

System

Figure 1:
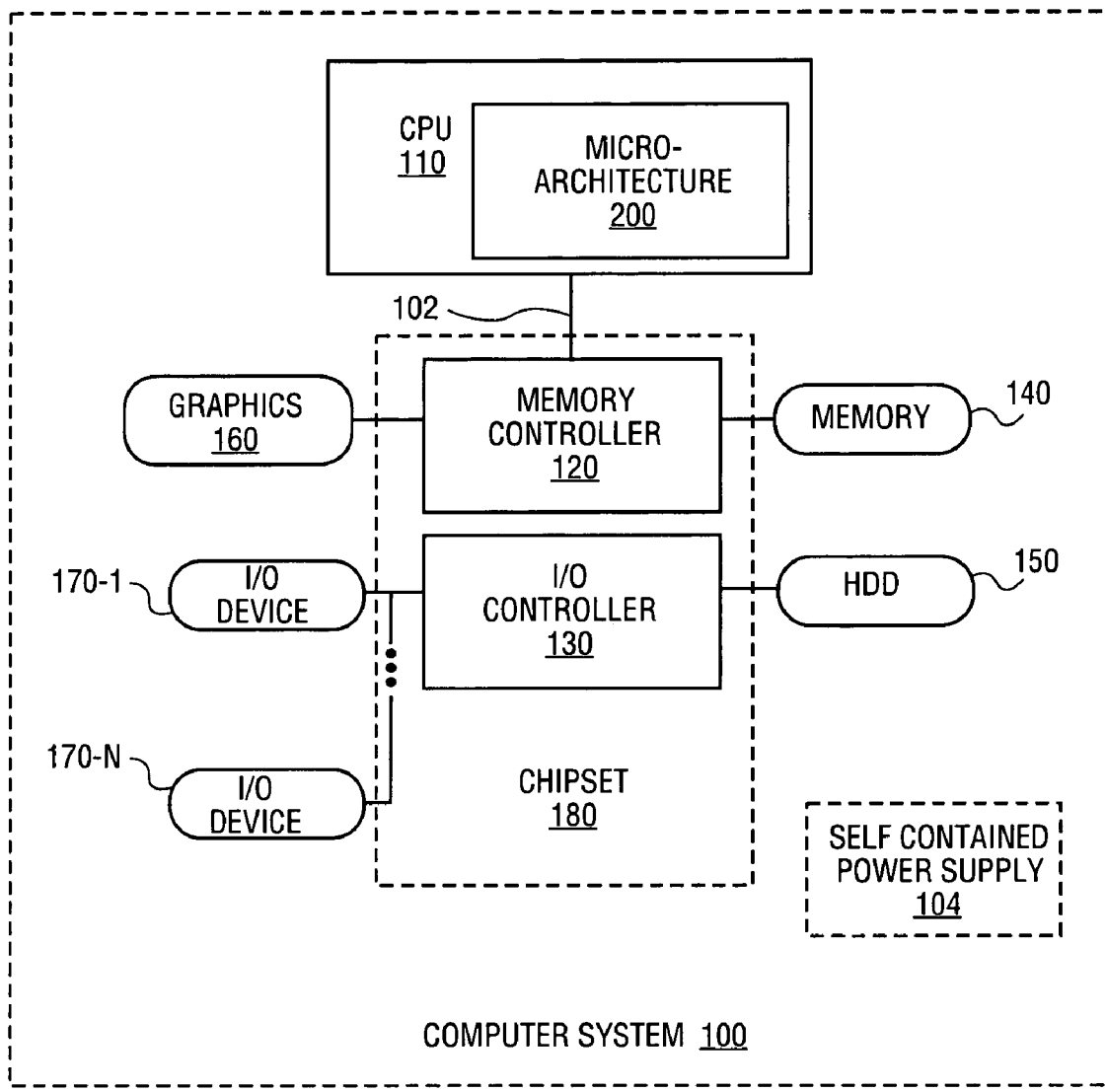
FIG. 1 is a block diagram illustrating a computer system, including a CPU having a micro-architecture for redundant, zero micro-operation removal, in accordance with one embodiment of the invention.

FIG. 1 is a block diagram illustrating a computer system 100 including a processor 110 having micro-architecture 200, in accordance with one embodiment of the invention. In one embodiment, micro-architecture 200 may remove redundant zero micro-operations, in accordance with one embodiment of the invention. Computer system 100 comprises a processor system bus (front side bus (FSB)) 102 for communicating information between the processor (CPU) 110 and a chipset 180 coupled together via FSB 102.

As described herein, the term "chipset" is used in a manner well-known to those skilled in the art to describe collectively the various devices coupled to CPU 110 to perform desired system functionality. Chipset 180 is comprised of a memory controller or memory controller hub (MCH) 120, as well as an input/output (I/O) controller or I/O controller hub (ICH) 130. Memory controller 120 of chipset 180 is coupled to main memory 140 and one or more graphics devices or graphics controller 160.

In one embodiment, main memory 110 is volatile memory, including but not limited to, random access memory (RAM), synchronous RAM (SRAM), double data rate (DDR) S-data RAM (SDRAM), Rambus data RAM (RDRAM), or the like. In addition, hard disk drive devices (HDD) 150, as well as one or more I/O devices 170 (170-1, ..., 170-N) are coupled to I/O controller 130 of chipset 180. As illustrated, CPU 110 includes micro-architecture 200 for removing redundant zero micro-operations, in accordance with one embodiment of the invention, which is further illustrated with reference to FIG. 2.

It should be understood that embodiments of the invention may be used in any apparatus having a processor. Although embodiments of system 100 are not limited in this respect, system 100 may be a portable device that include a self contained power supply (source) 104, such as a battery. A non-exhaustive list of examples of such portable devices includes laptop and notebook computers, mobile telephones, personal digital assistants (PDAs), and the like. Alternatively, system 100 may be a non-portable device, such as, for example, a desktop computer or a server computer not including optional source 104.

Processor 110 of FIG. 1 may be implemented to support various instruction set architectures. For example, in one embodiment, micro-architecture 200 of FIG. 2 may operate using, for example, 64-bit registers. However, processor 110 may support, for example, a 128-bit instruction set architecture (ISA) such as, for example, 128-bit streaming single instruction multiple data (SIMD) extensions (SSE) as well as streaming SIMD data extension two (SSE2) ISAs ("128-bit ISA"). In one embodiment, 128-bit registers of the 128-bit ISA are contained within read register file (RRF) 260 (FIG. 2).

In order to implement a 128-bit ISA using a 64-bit micro-architecture, in one embodiment, 128-bit operand of received macro-instructions are decoded into a first and second uOP by splitting each 128-bit register operand into two uOPs that generate the lower (least significant bit (LSB)) and upper (most significant bit (MSB)) 64-bit chunks of the 128-bit target register. In one embodiment, these two halves of the architectural register are treated within the micro-architecture as two independent registers, such as, micro-architecture 200 of FIG. 2.

Figure 2:
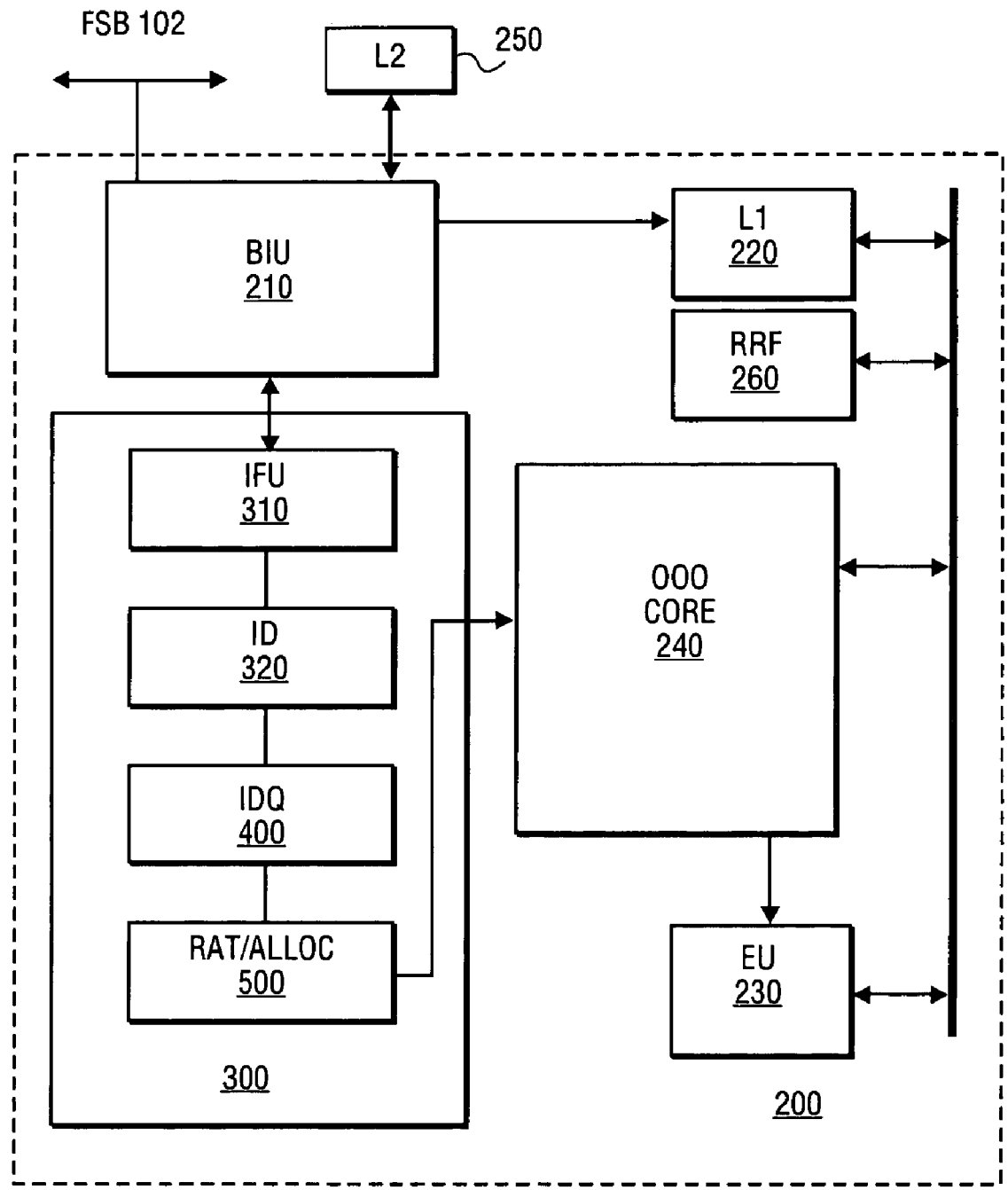
FIG. 2 is a block diagram further illustrating the micro-architecture of FIG. 1, in accordance with a further embodiment of the invention.

FIG. 2 illustrates micro-architecture 200 of CPU 110 to show redundant zero micro-operation removal, as described below. In the embodiment illustrated, micro-architecture 200 is configured to perform dynamic execution. As described herein, dynamic execution refers to the use of front-end logic 300 to fetch the next instructions according to program order and prepare the instructions for subsequent execution in the system pipeline. As illustrated, front-end logic 300 is comprised of an instruction fetch unit (IFU) 310 which fetches the upcoming program instructions for execution and prepares the instructions for future use within the system pipeline.

In effect, the front-end logic 300 supplies a high bandwidth stream of decoded instructions to the out-of-order (OOO) core, which directs execution (the actual completion) of the instructions. In order to execute the instructions in the most efficient manner, the front-end logic 300 may utilize highly accurate branch prediction logic (not shown) in order to speculate where a program is going to execute next, or as referred to herein, dynamic execution. Once received, micro-operations are scheduled to avoid stalling when following delayed instructions. In other words, micro-operations are executed in an "out-of-order" execution fashion when required to ensure the most efficient use of available processor resources.

Accordingly, front-end logic 300 may include an instruction fetch unit (IFU) 310 for fetching macro-instructions from, for example, level 2 cache (L2) 250 via bus interface unit (BIU) 210. Once the instructions are fetched, the instructions are decoded into basic operations, referred to herein as micro-operations (uOPs), which the execution units (EU) 230 execute. In order words, IFU 310 will fetch a macro-instruction from, for example, L2 cache 250, which is provided to instruction decoder (ID) 320. In response to the received macro-instruction, ID 320 will decode the macro-instruction into one or more uOPs which are provided to instruction decoder queue (IDQ) 400. Subsequently, the uOPs are provided to an allocation (ALLOC) logic 400 for destination register allocation and a register alias table (RAT) logic (RAT/ALLOC) 400 for register renaming, prior to submission to OOO core 240 and execution by EUs 230.

In one embodiment, the micro-architecture 200 of FIG. 1 may implement, for example, a 128-bit streaming single instruction multiple data (SIME) extensions as well as streaming SIME extensions two (SSE2) instruction set architectures (ISAs) using, for example, a 64-bit micro-architecture. The 128-bit SSE/SSE2 (ISA (128-bit ISA) is implemented by splitting each 128-bit instruction into two micro-operations (uOPs) that generate the lower (least significant bit (LSB)) and upper (most significant bit (MSB)) 64-bit portions of the 128-bit target register. However, for certain instructions, such as scalar load instructions, micro-architecture 200 may add a redundant micro-operation that uses valuable resources such as allocation slots as well as execution units.

In one embodiment, a typical instruction for the set of instructions that require loading, for example, the lower portion of the 128-bit register (scalar) and zero in the upper portion is depicted as follows:

MOVSS instruction when source operand is memory location and destination operand is XXM register:
DEST[31-0]←SRC;
DEST[127-32]←0000000000000000000000000H;

The MOVSS macro-instruction loads 32 bits in the lower (LSB) portion of the destination register and then zeroes the upper (MSB) portion. Alternatively, a MOVSD macro-instruction loads 64 bits in the lower portion of the destination register and then zeroes the upper portion. Scalar algorithms make use of such MOVSS as well as MOVSD macro-instructions, collectively referred to herein as a "zero load macro-instructions." In such scalar algorithms, a zero load macro-instruction prevents false dependencies on the upper part (MSB) of the register caused when using a 64-bit load into the lower part alone and implementing a 128-bit register. Accordingly, for a 64-bit micro-architecture implementation, in one embodiment, zero load macro-instructions require the generation of two uOPs as shown in the following zero-load micro-code flow:

```
destination_low :=64_bit_load(MEM_address);

# Clear the upper part.

destination_high : = move(64_bit_ZERO);
```

As illustrated, the micro-code flow includes a first uOP, referred to herein as a "load uOP" and a second uOP referred to herein as a "zero uOP". In one embodiment, it can be shown that the scalar algorithms do not use the upper (MSB) portion of the register (destination_high) as a source. In addition, once the upper portion is cleared by the first instance of the zero uOP, subsequent zero uOPs for clearing are redundant and therefore can be safely removed. One embodiment for safely removing redundant zero uOPs is depicted with reference to FIG. 3.

Figure 3:
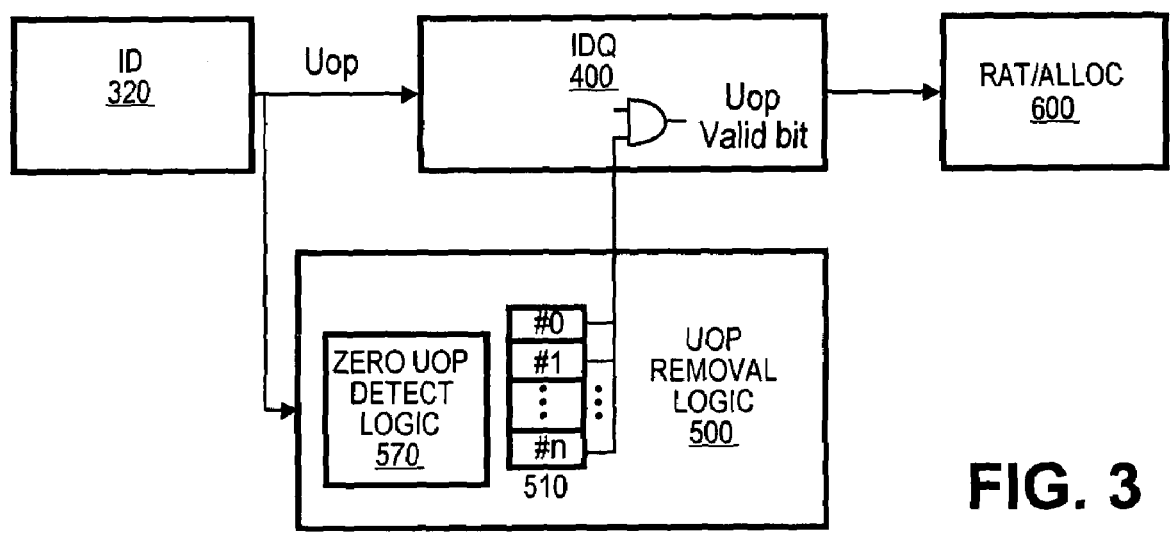
FIG. 3 is a block diagram further illustrating front-end logic of FIG. 2, in accordance with a further embodiment of the invention.

As illustrated in FIG. 3, the front-end logic 300 of FIG. 2 is depicted in accordance with one embodiment of the invention. As illustrated, ID 320 generates various uOPs 322 that are provided to IDQ 400. In addition, front-end logic 300 may include uOP removal logic 500. In one embodiment, uOP removal logic 500 includes a data structure, such as, for example, a table 510 which identifies, for example, 128-bit registers contained in register file 260 (FIG. 2).

Accordingly, when zero uOP detect logic 570 of logic 500 identifies a zero uOP or other uOPs that clear at least an upper (MSB) of a register, logic 550 sets a bit value (clear bit) contained within data structure 510 to identify the register associated with the uOP as already cleared. When the register is already cleared, the IDQ 400 is sent a signal to clear a validation bit of the zero uOP or a detected uOP, as described above. In other words, ID 320 generates, in response to a received zero load macro-instruction, the indicated zero load micro-code flow including the load uOP to load the data within the LSB portion of the destination register and the zero uOP to clear the MSB portion of the destination register.

In response, removal logic 500 detects the zero uOP and identifies whether the destination register associated with the zero uOP is cleared (set clear bit), for example, from a previous uOP. Such instructions may include, for example, an exclusive logical OR (XOR) operation having an identical source and destination register as well as addition or subtraction operations or the like, which clear the contents of the register. When such is the case, removal logic 500 will de-assert a valid bit value associated with the zero uOP. As a result, although the IDQ 400 receives both uOPs, the zero uOP is identified as invalid by the cleared valid uOP bit. Consequently, the load uOP is provided to RAT 600 and the zero-uOP is disregarded. In one embodiment, detection of a macro-instruction from a move of a register marked as a zero register into another register marked as a zero register results in the disregarding of any corresponding uOPs.

Accordingly, as long as the register remains clear, subsequent instances of zero-load macro-instruction will have the zero uOP removed from their flow. However, when a different assignment to the register is identified, the register cannot be assumed to remain clear and normal operation is resumed. In one embodiment, normal operation results in a clearing or disabling of the clear bit contained within data structure 510. As described herein, the terms, "set", "setting", "assert", "asserting", "enable" and "enabling" do not imply active high logic and may include, for example, active low logic such that driving a zero value results in an assertion of a signal line or setting of a bit value. In an alternative embodiment, an active high architecture may also be included while remaining in compliance with embodiments of the present invention.

Accordingly, the detection of a zero uOP results in setting of the clear bit for a specific register within, for example, data structure 510. From that time onward, the valid bit of subsequent zero uOP or similar uOPs is cleared. The various clear bits within data structure 510 are reset when the pipe is cleared. In addition, if a different uOP assignment to a register is detected, the registers corresponding clear bit is reset.

Figure 4:
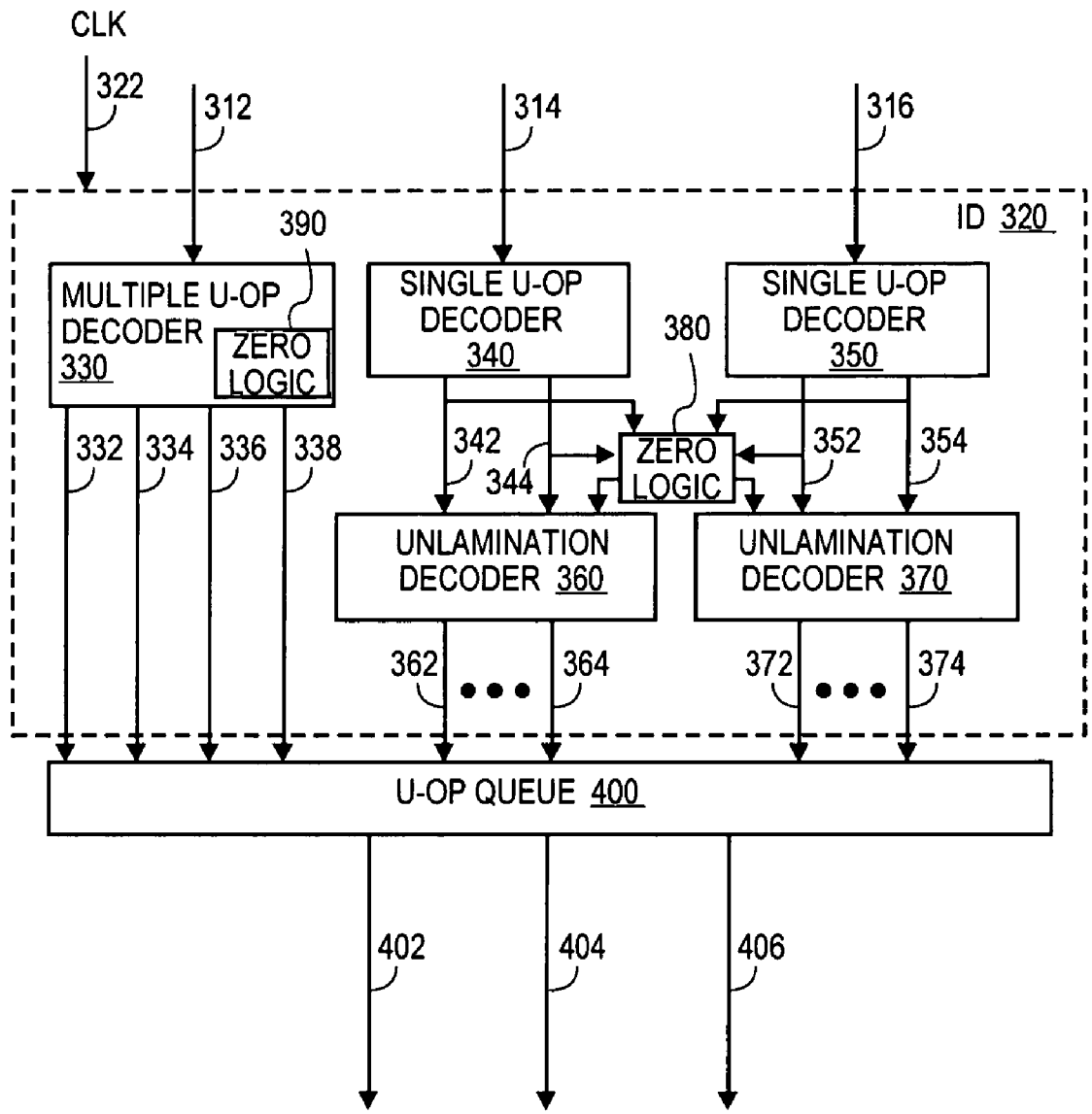
FIG. 4 is a block diagram further illustrating instruction decoder of FIG. 3, in accordance with a further embodiment of the invention.

FIG. 4 depicts ID 320 of FIG. 2, in accordance with a further embodiment of the invention. In the embodiment described, the ID 320 may be comprised of a multiple uOP decoder 330, a single uOP decoder 340, as well as a single uOP decoder 350. ID 320 may also include unlamination decoders 360 and 370 coupled to single uOP decoder 340 or single uOP decoder 350, as well as uOP queue 400. Without the use of unlamination decoders 360 and 370, macro-instructions that are decoded into two or more uOPs are decoded by multiple uOP decoder 330. As a result, if a sequence of consecutive macro-instructions, which are decoded into two or more uOPs, are received by ID 320 (so that during the time simple uOP decoders 340/350 do not decode macro-instructions), uOP queue 400 receives, on average, two uOPs per clock cycle and ALLOC/RAT is unable to fully utilize the allocation and renaming capacity of three uOPs per clock cycle of OOO core 240 (FIG. 2).

Accordingly, in one embodiment of the invention, certain macro-instructions, such as zero load macro-instructions, are decoded by single uOP decoders 340 and 350 into a "laminated uOP," which is sent to the unlamination decoders 360/370. These macro-instructions share the property that each macro-instruction is ultimately decoded into two or more uOPs to be executed by EUs 230 (FIG. 2). When decoding such a macro-instruction into a laminated uOP, single uOP decoders 340/350 may generate unlamination information to be sent to unlamination decoders 360/370.

In one embodiment, unlamination decoders 360/370 may use the unlamination information to generate, from the laminated uOP, the two or more uOPs executed by EUs 230 (FIG. 2). In other words, a laminated uOP is identified by unlamination decoders 360/370 as a uOP that requires conversion ("unlamination") into two or more uOPs. Likewise, the unlamination information provides unlamination decoders 360/370 with the necessary information to perform unlamination of the laminated uOP into the two or more uOPs.

Accordingly, once unlamination decoders 360/370 generates the two or more uOPs, the uOPs are sent to uOP queue 400. Consequently, for certain macro-instructions, such as zero load macro-instructions, the single uOP decoders 340/350 and unlamination decoders 360/370 may jointly generate two or more uOPs for placement in uOP queue 400 such as the load uOP and the zero uOP for a received zero load macro-instruction. In some embodiments of the invention, the maximum number of uOPs generated by unlamination decoders 360/370 may not exceed the maximum number of uOPs generated in a clock cycle by multiple uOP decoder 330.

In the embodiment described, the single uOP decoders 340 and 350 generate a laminated uOP (342/352) and corresponding unlamination information (344/354). In response to receipt of the uOP and unlamination information, unlamination decoders 360 and 370 can generate the load uOP and the zero load uOP from the received information. In other words, as described herein, the term "unlamination" refers to the idea that a simple operation can change one uOP into a two uOP flow.

Accordingly, in one embodiment, single uOP decoders 340 and 350 generate the zero load micro-code flows using unlamination decoders 360 and 370. However, in the embodiment described, zero logic 380 receives the micro-operation and unlamination information. In the embodiment, zero logic 380, using for example a data structure (not shown) for a plurality of 128-bit registers supported within the micro-architecture 300, identifies whether a destination register associated with a zero load macro-instruction is in a cleared state. When such is the case, zero logic 380 will direct one of the unlamination decoders 360/380 to generate a single load uOP such that the zero uOP is not generated.

In a further embodiment, multiple uOP decoder 330 will generate the zero load load micro-code flow when directed by zero logic 390, which identifies the first occurrence of a zero load macro-instruction. However, when the received macro-instruction 312 references a destination register having a set clear bit within the register data structure, the zero logic 390 directs the multiple uOP decoder 330 to generate the load uOP instruction rather than full zero load micro-code flow. Accordingly, in the embodiment described with reference to FIG. 4, ID 320 includes zero logic 380/390 to prohibit the generation of redundant zero uOPs when a referenced destination register has a set clear bit value indicating that the register is cleared. In one embodiment, zero logic 380/390 updates and references a data structure (See Table 510 FIG. 3) such that the zero information propagates to all decoders and is used in the same clock to remove a uOP at proceeds the zeroing of that register.

Figure 5:
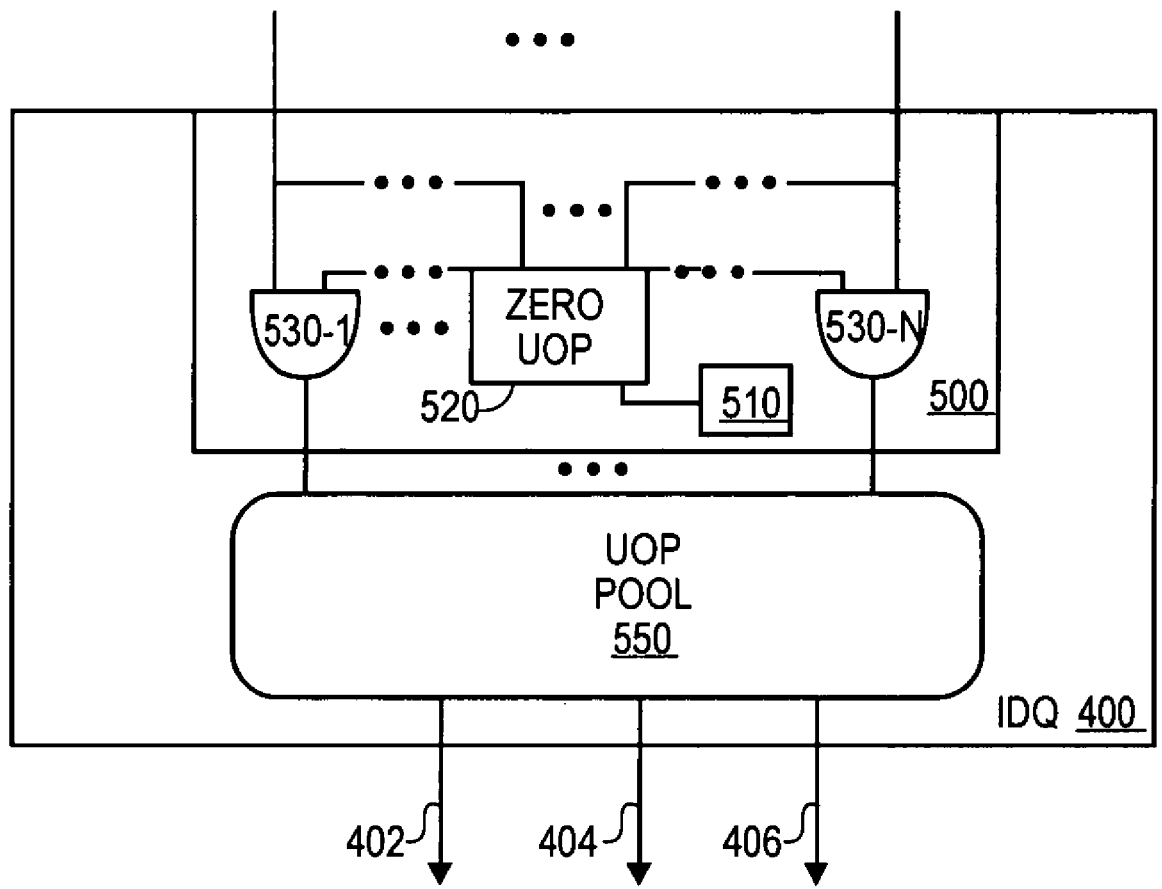
FIG. 5 is a block diagram illustrating instruction decoder queue of FIG. 4, in accordance with the further embodiment of the invention.

In a further embodiment, as illustrated in FIG. 5, ID 320 generates the zero load micro-code flows as described above and provides the flows to IDQ 400. In response, zero uOP logic 520 identifies whether the zero uOP of the flow references a destination register having a set clear bit value to identify a destination register as cleared. When such is the case, zero uOP logic 520 disables a validity bit of the received zero uOP such that the zero uOP is not provided to uOP pool 550. Accordingly, in the embodiment described, redundant zero uOP are removed within IDQ 400. Procedural methods for implementing embodiments of the present invention are now described.

Operation

Figure 6:
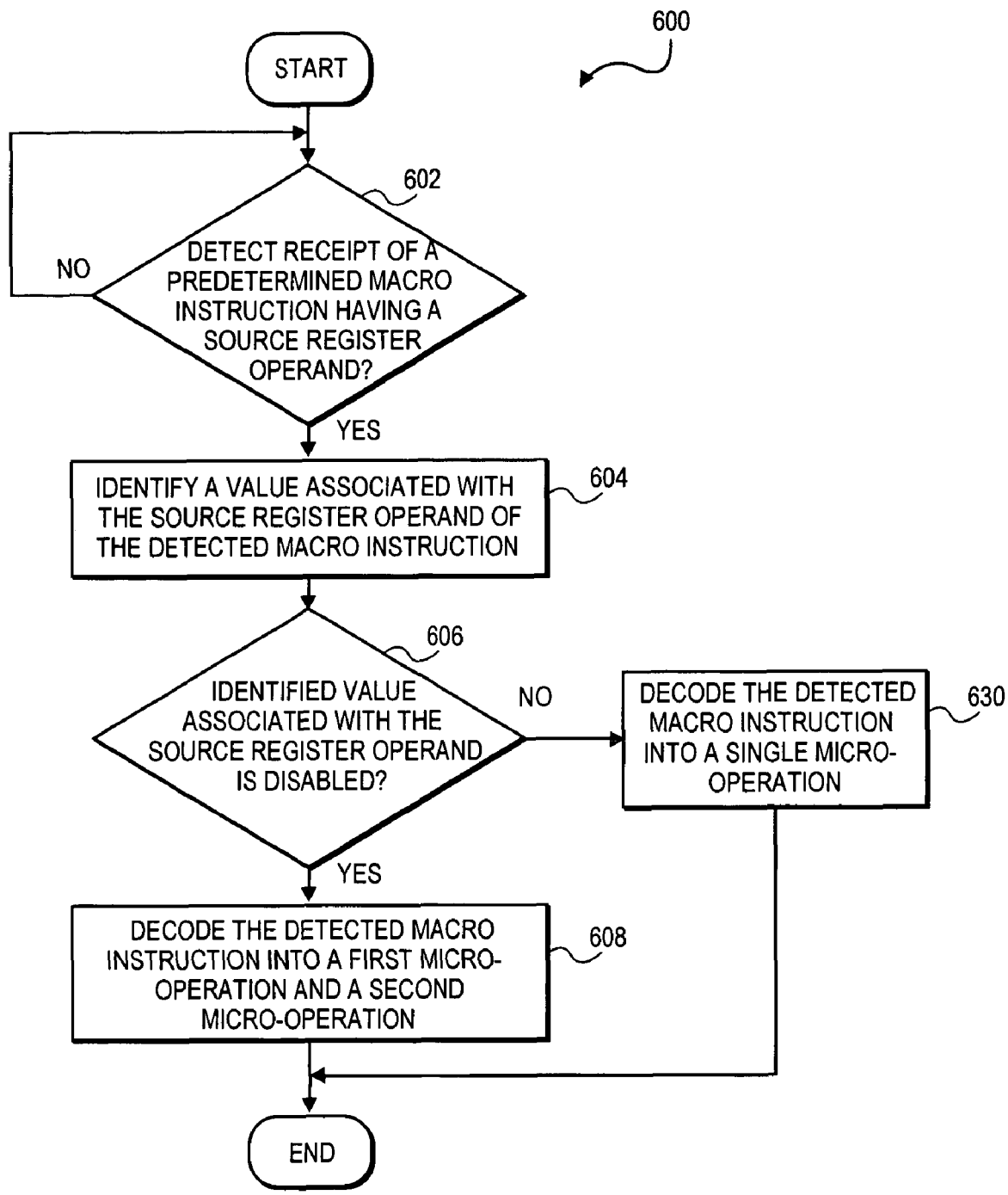
FIG. 6 is a flowchart illustrating a method for removal of redundant zero micro-operations, in accordance with one embodiment of the invention.

FIG. 6 is a flowchart illustrating a method 600 for removal of redundant zero micro-operations (uOPs), in accordance with one embodiment of the invention. As indicated above, zero load macro-instructions result in the generation of a load uOP to load data within the LSB portion of a destination register, as well as a zero uOP to clear an MSB portion of a destination register operand. In accordance with one embodiment of the invention, a clear bit, as described above, is associated with each, for example, 128-bit register process within a micro-architecture. According to a value of this clear bit, which is set following detection of an initial zero load macro-instruction as well as a move of zero from one register to another register, subsequent zero load macro-instructions are decoded into a single uOP flow such that redundant zero uOPs are removed.

At process block 602, it is determined whether a predetermined macro-instruction having a register operand is detected. As indicated above, the predetermined macro-instruction is, in one embodiment, a zero load macro-instruction. Once detected, at process block 604, a value associated with the register operand of the detected macro-instruction is identified. In one embodiment, the identified value refers to a clear bit, such as, for example, within data structure 510, as illustrated with reference to FIG. 3. At process block 606, it is determined whether the bit value is disabled. If the bit value is disabled, at process block 606, the detected macro-instruction is decoded into a first uOP and second uOP. In one embodiment, the first uOP refers to the load uOP and the second uOP refers to the zero uOP. Otherwise, at process block 630, the detected macro-instruction is decoded into a single uOP or a load uOP.

Figure 7:
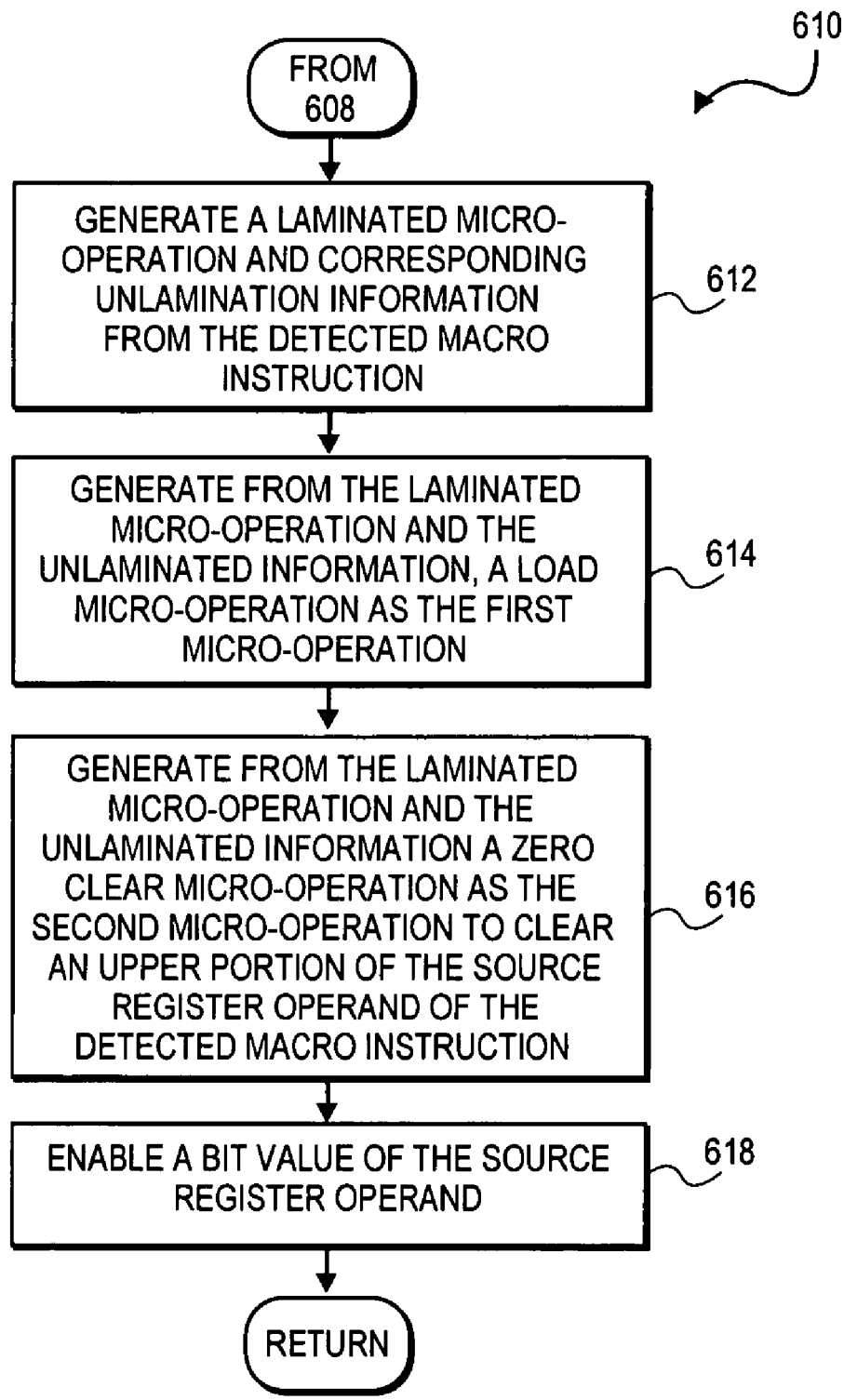
FIG. 7 is a flowchart illustrating a method for decoding a detected macro-instruction into a first micro-operation and a second micro-operation, in accordance with one embodiment of the invention.

FIG. 7 is a flowchart illustrating a method for decoding the detected macro-instruction of process block 608 of FIG. 6, in accordance with one embodiment of the invention. At process block 612, a laminated uOP and corresponding unlamination information is generated from the detected macro-instruction. At process block 614, a load uOP is generated from the laminated uOP and the unlamination information. At process block 616, a zero uOP is generated from the laminated uOP and unlamination information to clear an upper (MSB) portion of the register operand of the detected macro-instruction. In one embodiment, method 632 is performed within, for example, single uOP, as well as unlamination decoders (340/350 and 360/370) of ID 320, as illustrated in FIG. 4.

Figure 8:
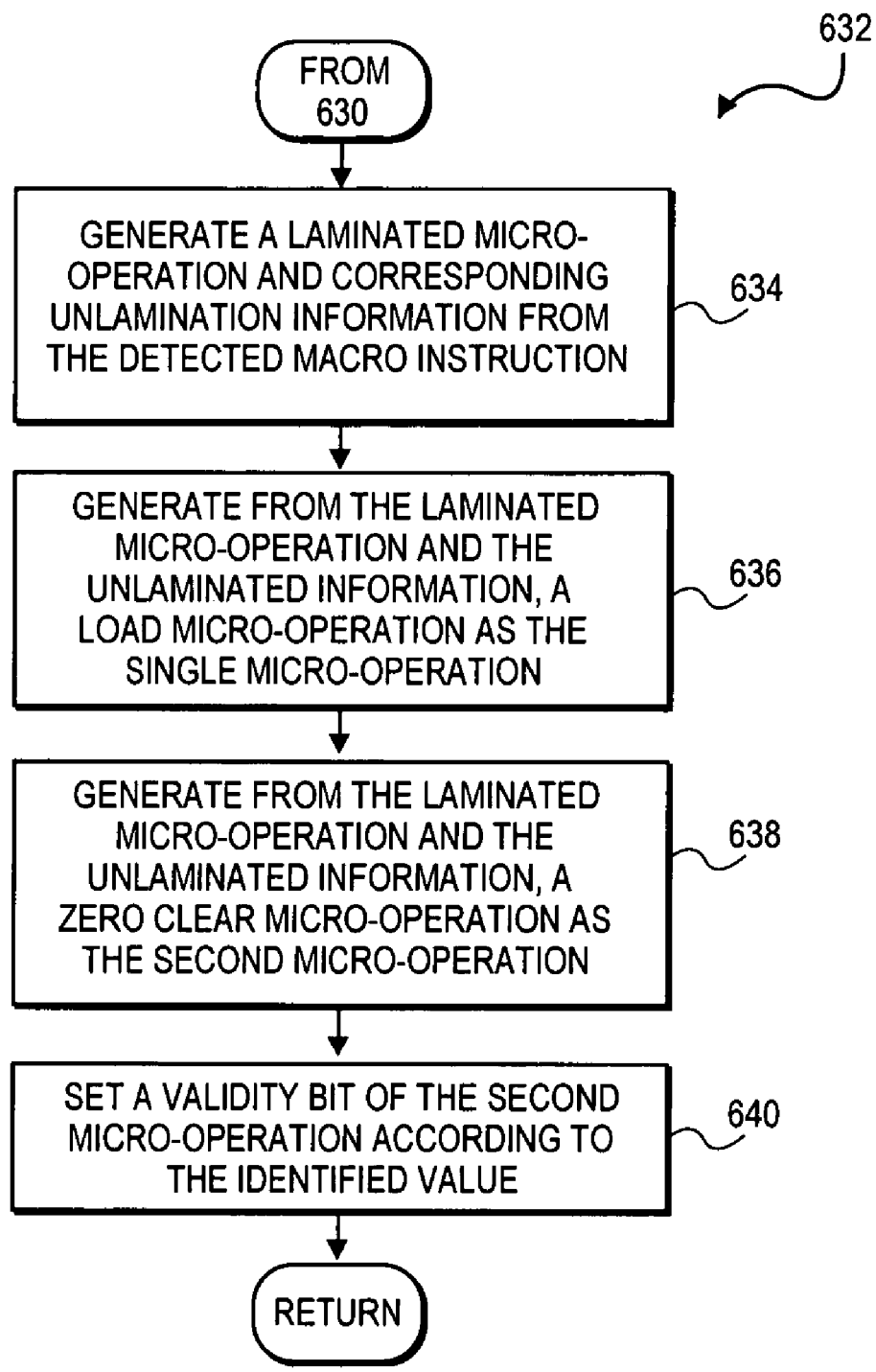
FIG. 8 is a flowchart illustrating a method for decoding a detected macro-instruction into a single micro-operation, in accordance with one embodiment of the invention.

FIG. 8 is a flowchart illustrating a method 632 for decoding the detected macro-instruction into a single uOP of process block 630 of FIG. 6, in accordance with one embodiment of the invention. At process block 634, a laminated uOP and corresponding unlamination information is generated from the detected macro-instruction. At process block 636, a single uOP is generated from the laminated uOP and the unlamination information. At process block 638, a zero uOP is generated from the laminated uOP and unlamination information. At process block 640, a validity bit of the zero uOP is reset, such that the zero uOP is disregarded by, for example, zero uOP logic 520 in conjunction with logic AND gates 530 (530-1, . . . , 530-N), such that unvalid zero uOPs are not placed within uOP pool 550 and are not forwarded to RAT 600.

In a further embodiment, certain zero producing macro-instructions, as well as zero transferring macro-instructions, are received by instruction decoder 320 (collectively referred to herein as a zero macro-instruction. As described herein, zero producing instructions refer to move instructions which clear contents of a destination register previously cleared by a prior micro-operation. Such instructions may also include XOR macro-operations having matching source and destination registers is identified as previously cleared by a prior micro-operation.

As described herein, zero transferring instructions refer to macro-instructions that produce zero as a result value when the destination and source register operands of the macro-instruction are identified as cleared by a previous micro-operation. Accordingly, for identified zero transferring instructions, as well as zero producing instructions (zero macro-instructions), such instructions may simply be disregarded and not decoded or decoded into one or more micro-operations with the validity bit of each micro-operation disabled. As indicated above, when a validity bit of a received uOP is disabled, the uOP is disregarded by the instruction decoder queue.

Figure 9:
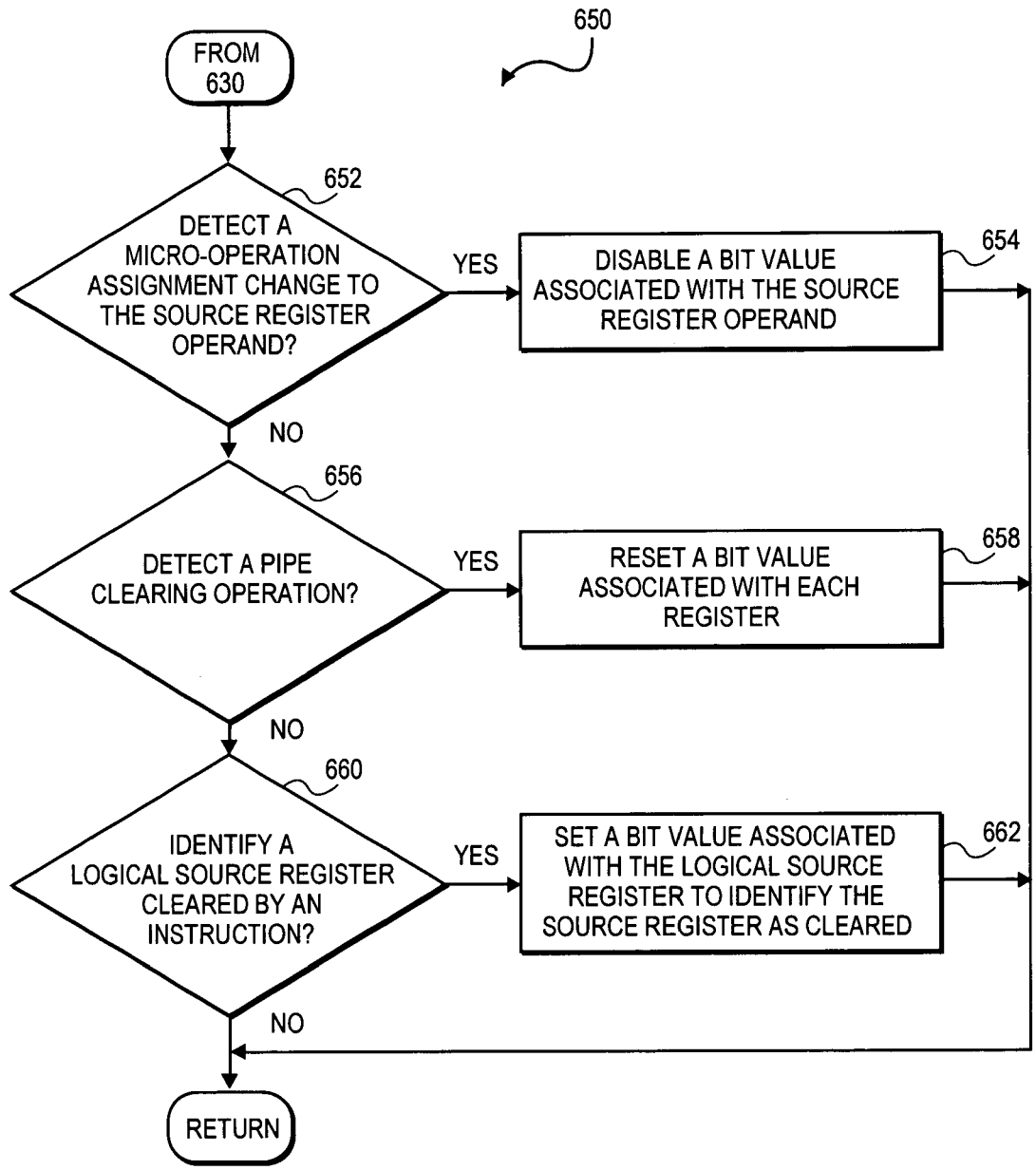
FIG. 9 is a flowchart illustrating a method for resetting a bit value associated with a logical source register, in accordance with a further embodiment of the invention.

FIG. 9 is a flowchart illustrating a method 650 for setting or resetting a bit value associated with the registers of a micro-architecture, such as contained with, for example, within for example, register file 260, as illustrated in FIG. 2. At process block 652, it is determined whether a uOP assignment change to the source register operand is detected. When such is the case, at process block 654, a bit value associated with the register operand of the detected macro-instruction is disabled. Otherwise, at process block 656, it is determined whether a pipe clearing operation is detected. When such is the case, at process block 658, a bit value (clear bit) associated with each register is reset to identify the or each of the architecture registers as unclear. Otherwise, at process block 660, it is determined whether an architecture register is cleared by a detected uOP. When such is the case, at process block 652, a bit value (clear bit) associated with the architecture register is set to identify the source register as cleared.

Figure 10:
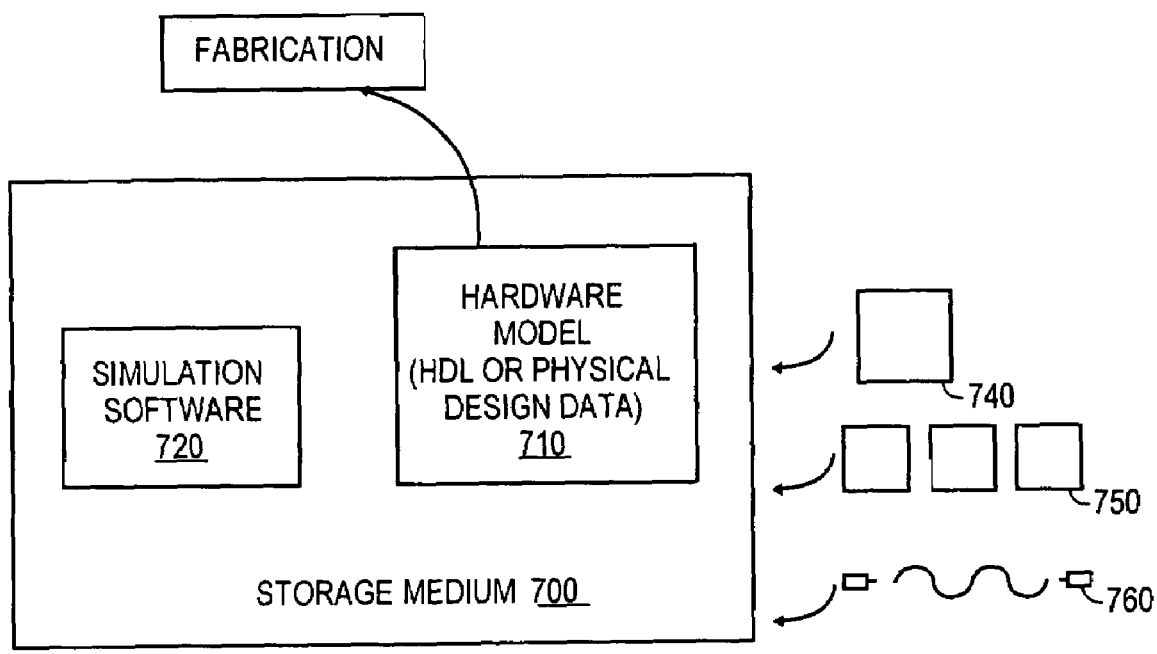
FIG. 10 is a block diagram illustrating various design representations or formats for simulation, emulation and fabrication of a design using the disclosed techniques.

FIG. 10 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. A memory 750 or a magnetic or optical storage 640, such as a disk, may be the machine readable medium. Any of these mediums may carry the design information. The term "carry" (e.g., a machine readable medium carrying information) thus covers information stored on a storage device. The set of bits describing the design or a particular of the design are (when embodied in a machine readable medium, such as a storage medium) an article that may be sealed in and out of itself, or used by others for further design or fabrication.

Accordingly, embodiments described reduce the uOP count for algorithms that use a significant amount of scalar loads. Simulations showed a nine percent reduction in uOP count. Accordingly, the removal logic described herein may be embodied in various portions of the CPU that use, for example, 64-bit micro-architecture to implement a 128-bit ISA and require improving of decoding capabilities, efficiency of the out-of-order execution storage, as well as execution unit usage.

ALTERNATE EMBODIMENTS

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the two micro-operation flow using source override of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
   detecting receipt of a predetermined macro-instruction having a single-instruction-multiple-data extension data type register operand;
   identifying a value associated with the register operand of the detected macro-instruction;
   decoding the detected macro-instruction into a first micro-operation and a second micro-operation if the identified value associated with the register operand is disabled; and
   decoding the detected macro-instruction into a single micro-operation if the identified value associated with the register operand is enabled according to an initialization of a portion of the register operand by a previous micro-operation.

2. The method of claim 1, wherein decoding the identified macro-instruction into first and second micro-operations comprises:
   generating a laminated micro-operation and corresponding unlamination information from the detected macro-instruction;
   generating from the laminated micro-operation and the unlamination information, a load micro-operation as the single micro-operation.

3. The method of claim 2, further comprising
   generating from the laminated micro-operation and the unlamination information a zero clear micro-operation as the second micro-operation to clear an upper portion of the register operand of the detected macro-instruction; and
   setting a validity bit of the second micro-operation according to the identified value.

4. The method of claim 1, wherein identifying the value associated with the register operand comprises:
   querying a data structure to identify a bit value associated with the register operand of the detected macro-instruction; and
   determining a status of the identified bit value as one of enabled and disabled.

5. The method of claim 1, wherein decoding the identified macro-instruction into first and second micro-operations comprises:
generating a laminated micro-operation and corresponding unlamination information from the detected macro-instruction;
generating from the laminated micro-operation and the unlamination information, a load micro-operation as the first micro-operation; and
generating from the laminated micro-operation and the unlamination information a zero clear micro-operation as the second micro-operation to clear an upper portion of the register operand of the detected macro-instruction.

6. The method of claim 1, wherein decoding the identified macro-instruction into a single micro-operation comprises:
decoding the detected macro-instruction into a first micro-operation and a second micro-operation; and
setting a validity bit of the second micro-operation according to the identified value of a register operand of the detected macro-instruction.

7. The method of claim 1, wherein decoding the identified macro-instruction into first and second micro-operation further comprises:
enabling a bit value of the register operand once the macro-instruction is decoded into the first and second micro-operations.

8. The method of claim 1, further comprising: detecting a micro-operation assignment change to the register operand; and disabling a bit value associated with the register operand.

9. The method of claim 1, further comprising: detecting a pipe clearing operation; and resetting a bit value associated with each register.

10. The method of claim 1, further comprising: identifying a logical register cleared by an instruction; and setting a bit value associated with the logical register to identify the register as cleared.

11. An article of manufacture including a machine readable storage medium having stored thereon instructions which may be used to program a system to perform a method, comprising:
detecting receipt of a predetermined macro-instruction having a register operand;
identifying a value associated with the register operand of the detected macro-instruction;
decoding the detected macro-instruction into a first micro-operation and a second micro-operation if the identified value associated with the register operand is disabled; and
decoding the detected macro-instruction into a single micro-operation if the identified value associated with the register operand is enabled according to an initialization of a portion of the register operand by a previous micro-operation.

12. The article of manufacture of claim 11, wherein prior to receiving the request the method comprises:
generating a laminated micro-operation and corresponding unlamination information from the detected macro-instruction;
generating from the laminated micro-operation and the unlamination information, a load micro-operation as the single micro-operation.

13. The article of manufacture of claim 12, wherein prior to receiving the request the method comprises:
generating from the laminated micro-operation and the unlamination information a zero clear micro-operation as the second micro-operation to clear an upper portion of the register operand of the detected macro-instruction; and
setting a validity bit of the second micro-operation according to the identified value.

14. The article of manufacture of claim 11, wherein prior to receiving the request the method comprises:
querying a data structure to identify a bit value associated with the register operand of the detected macro-instruction; and
determining a status of the identified bit value as one of enabled and disabled.

15. The article of manufacture of claim 11, wherein prior to receiving the request the method comprises:
generating a laminated micro-operation and corresponding unlamination information from the detected macro-instruction;
generating from the laminated micro-operation and the unlamination information, a load micro-operation as the first micro-operation; and
generating from the laminated micro-operation and the unlamination information a zero clear micro-operation as the second micro-operation to clear an upper portion of the register operand of the detected macro-instruction.

16. The article of manufacture of claim 11, wherein prior to receiving the request the method comprises:
decoding the detected macro-instruction into the first micro-operation and the second micro-operation; and
setting a validity bit of the second micro-operation according to the identified value.

17. The article of manufacture of claim 11, wherein prior to receiving the request the method comprises:
enabling the identified value of the register operand once the macro-instruction is decoded into the first and second micro-operations.

18. The article of manufacture of claim 11, wherein prior to receiving the request the method comprises:
detecting a micro-operation assignment change to the register operand; and
disabling a bit value associated with the register operand.

19. The article of manufacture of claim 11, wherein prior to receiving the request the method comprises:
detecting a pipe clearing operation; and
resetting a bit valid associated with each register.

20. The article of manufacture of claim 11, wherein prior to receiving the request the method comprises:
identifying a logical register cleared by an instruction; and
setting a bit value associated with the logical register to identify the register as cleared.

21. A processor, comprising:
an instruction decoder to identify a value associated with a register operand of a detected macro-instruction, to decode the detected macro-instruction into a first micro-operation and a second micro-operation if the identified value associated with the register operand is disabled and to decode the detected macro-instruction into a single micro-operation if the identified value associated with the register operand is enabled according to an initialization of a portion of the register operand by a previous micro-operation.

22. The processor of claim 21, further comprising:
an instruction decoder queue to receive the first and second micro-operations and to forward the first and second micro-operation according to respective validity bits of the first and second micro-operations.

23. The processor of claim 21, wherein the instruction decoder sets a validity bit of the second micro-operation according to the identified value.

24. The processor of claim 21, wherein the instruction decoder comprises:
 a first decoder to generate a laminated micro-operation and corresponding unlamination information from the detected macro-instruction;
 an unlamination decoder to generate, from the laminated micro-operation and the unlamination information, a load micro-operation as the first micro-operation, and a zero micro-operation as the second micro-operation to clear an upper portion of the register operand of the detected macro-instruction.

25. The processor of claim 22, wherein the instruction decoder queue disregards the second micro-operation if the data valid bit is disabled.

26. A system comprising:
 a self contained power source;
 a memory controller coupled to a memory;
 an I/O controller coupled to the memory controller; and
 a control processing unit coupled to the memory controller and including:
  an instruction decoder to identify a value associated with a register operand of a detected macro-instruction, to decode the detected macro-instruction into a first micro-operation and a second micro-operation if the identified value associated with the register operand is disabled and to decode the detected macro-instruction into a single micro-operation if the identified value associated with the register operand is enabled according to an initialization of a portion of the register operand by a previous micro-operation.

27. The system of claim 26, wherein the instruction decoder sets a validity bit of the second micro-operation according to the identified value.

28. The system of claim 26, wherein the instruction decoder comprises:
 a first decoder to generate a laminated micro-operation and corresponding unlamination information from the detected macro-instruction;
 an unlamination decoder to generate, from the laminated micro-operation and the unlamination information, a load micro-operation as the first micro-operation, and a zero micro-operation as the second micro-operation to clear an upper portion of the register operand of the detected macro-instruction.

29. The system of claim 26, wherein the central processing unit further comprises:
 an instruction decoder queue to receive the first and second micro-operations and to forward the first and second micro-operation according to respective validity bits of the first and second micro-operations.

30. The system of claim 29, wherein the instruction decoder queue disregards the second micro-operation if a validity bit of the second micro-operation is disabled.

31. A method comprising:
 detecting receipt of a predetermined macro-instruction having a source register operand and a destination register operand of a single-instruction-multiple-data extension data type;
 identifying a value associated with the register operands of the detected macro-instruction;
 decoding the detected macro-instruction into one or more micro-operations;
 setting a validity bit of each micro-operation according to an identified value associated with one of the source register operands and the destination register operand of the macro-instruction; and
 discarding at least one micro-operation having a disabled validity bit.

32. The method of claim 31, wherein setting the validity bit of each macro-operation comprises:
 identifying the predetermined macro-instruction as a zero producing macro-instruction;
 determining whether an identified value associated with a destination register of the predetermined macro-instruction is enable;
 setting a validity bit of the one or more decoded micro-operations if the identified value associated with the destination register operand is enabled; and
 disabling a validity bit of the one or more decoded micro-operations if the identified value associated with the destination register operand is enabled.

33. The method of claim 31, wherein setting the validity bit of each of the micro-operations comprises:
 identifying the predetermined macro-instruction as a zero transferring macro-instruction;
 determining whether an identified value associated with the source register operand of the predetermined macro-instruction is enabled;
 determining whether an identified value associated with the destination register operand of the predetermined macro-instruction is enabled;
 disabling a validity bit of each decoded micro-operation if the identified values associated with the source register operand and destination register operand of the predetermined macro-instruction are enabled; and
 setting a validity bit of each of the decoded micro-operations if one of the identified values associated with the source register operand or the destination register operand of the predetermined macro-instruction are disabled.

* * * * *

UNITED STATES PATENT AND TRADEMARK OFFICE
CERTIFICATE OF CORRECTION

PATENT NO. : 7,213,136 B2 Page 1 of 1
APPLICATION NO. : 10/631628
DATED : May 1, 2007
INVENTOR(S) : Sperber et al.

It is certified that error appears in the above-identified patent and that said Letters Patent is hereby corrected as shown below:

In column 4, at line 39, delete "(SIME)" and insert --(SIMD)--.

In column 4, at line 40, delete "SIME" and insert --SIMD--.

Signed and Sealed this

Fifteenth Day of April, 2008

JON W. DUDAS
*Director of the United States Patent and Trademark Office*